3,337,996
THREAD GRINDING MACHINE
Gerhard Stade, Berlin, and Georg Stahn, Berlin-Tegel, Germany, assignors to Firma Herbert Lindner G.m.b.H. & Co., Wittenau, Germany
Filed Feb. 12, 1964, Ser. No. 344,358
Claims priority, application Germany, Apr. 11, 1963, L 44,621
14 Claims. (Cl. 51—95)

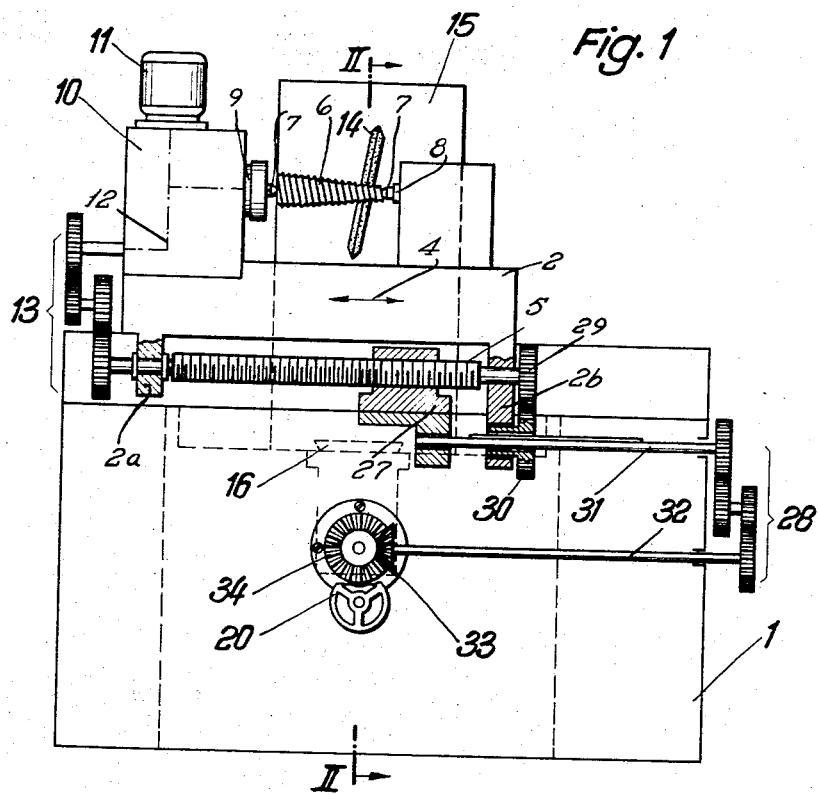
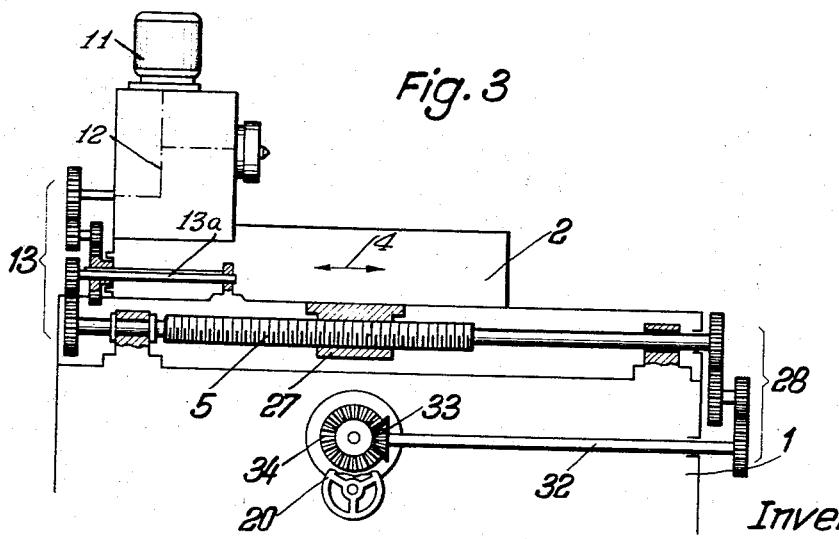

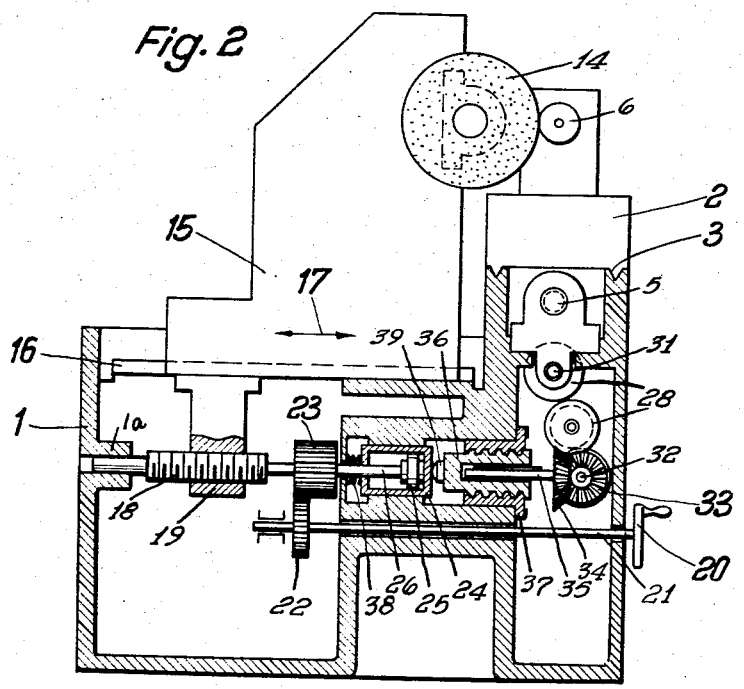
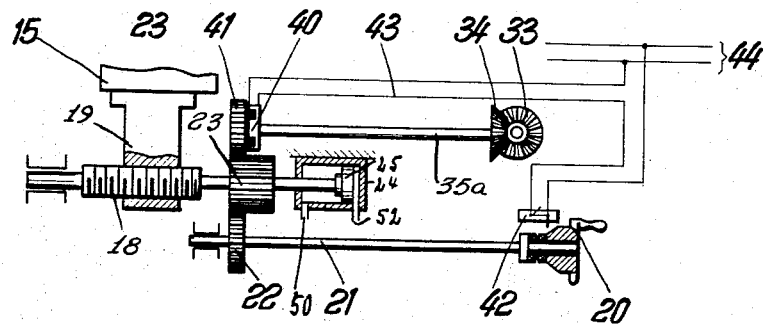

This invention relates in general to thread grinding machines and, in particular to a new and useful thread grinding machine particularly for grinding conical threads wherein the stand carrying the grinding wheel is moved in a continuous feed movement in timed relationship to the longitudinal and rotational movement of guide spindles carrying the workpiece.

In some prior art machines the grinding of taper threads is carried out by a continuous operation in which the feed movement of the grinding wheel or tool is controlled as a function of a movement of the guide spindle carrying the workpiece as controlled by a slantable ruler. In such constructions, the ruler is connected with the grinding table or slide and participates in the longitudinal movement thereof, and a roll is provided to scan the ruler and is displaceable thereby in a transverse direction to transmit its movement to the wheel stand carrying the grinding wheel. The use of such a control ruler involves certain disadvantages. In particular, the control ruler must be variable and therefore requires very exact adjustment and the mounting of the ruler must be such that it cannot shift due to forces reacting on it. In addition, every machine has a feed-adjustment path which is limited to a certain distance. For steep tapers, therefore, the ruler must be provided and adjusted by very careful adjusting work at the point on the table at which the workpiece cone to be ground is located.

In accordance with the invention, a grinding machine is provided which does not employ a ruler and movement of the guide spindle is controlled in timed relationship to the movement of the grinding wheel in order to perform taper grinding. For this purpose, the guide spindle is rotated by a motor which also drives through gears to a shaft mounted in the bed of the machine. The shaft acts through feed members or gears on a feed spindle of the wheel stand carrying the grinding wheel without affecting the rapid feed thereof.

In a preferred arrangement, the wheel stand carrying the grinding wheel is moved backwardly and forwardly in relation to the workpiece by a rotating screw which cooperates with a nut portion of the stand to move the stand backwardly and forwardly in accordance with the direction of rotation of such screw. Change gears are employed for achieving the desired feed control between the grinding wheel on the one hand and the carriage which contains the feed spindle on the other hand.

In one embodiment, the means for accomplishing this includes a sliding gear guided on a sliding shaft which is rotated through its shaft by change gears connected to the drive for the grinding wheel. The gear produces rotation of a feed screw carried by the carriage of the workpiece supporting spindle, which is moved backwardly and forwardly by this rotation of the feed screw.

In one embodiment, the feed screw is carried by the movable carriage carrying the workpiece supporting the spindle and in another embodiment, the feed screw is supported in the machine frame. In this latter case, the carriage of the workpiece supporting spindle carries a nut engageable with the screw. The carriage includes a gear carried on a movable shaft for transmitting the control feed movement during movement of the workpiece supporting spindle carriage. In all embodiments, the rapid feed of the various parts is uninfluenced, that is, the thrust of the rapid feed drive is not reduced by the continuous feed movement and taper grinding.

In one embodiment, the rapid feed drive preferably includes a hydraulic piston drive with an axially elongated pinion permitting axial movement of the pinion in relation to the driving gear. The driving gear may be operated, for example, through a gear transmission connected with the movement of the wheel stand for the grinding wheel or manually by use of a rotating hand wheel. In this instance, the wheel stand carrying the grinding wheel is moved by the direct connection of a moving piston, but the transmission further includes a rotatable screw engageable with a nut carried by the wheel stand which may be moved independently of the piston by rotation of a hand wheel. Such a construction permits manual feed without the transmission gearing blocking the manual feed and also permits a superimposition of the manual feed during the automatic feeding for the taper grinding. This is very advantageous when complicated or composite contours with transistions must be ground.

A further driving arrangement is achieved by a transmission which is connected between the drive for moving the carriage and the drive for moving the grinding wheel transversely thereto which includes an electro-magnetic coupling for causing the meshing engagement of a driving gear with an elongated pinion in the direct feed drive to the grinding wheel stand. The electro-magnet coupling is advantageously activated by a switch arranged to operate in conjunction with the hand wheel.

Accordingly, it is an object of this invention to provide a grinding machine wherein the grinding wheel stand, rotatably mounting a grinding wheel, is moved transversely in relation to longitudinal displacement of the spindle supporting the workpiece in timed relationship.

A further object of the invention is to provide an improved transmission for timing the movement of the workpiece support spindle in longitudinal directions in timed relationship to the back and forth movement of the grinding wheel in transverse directions providing change gear means for changing the movement relationship between the moving parts.

A further object of the invention is to provide an improved grinding wheel machine which includes means for moving the grinding wheel stand and the workpiece supporting carriage in transverse and longitudinal directions, respectively, in timed relationship and which further includes independent manual means for shifting the grinding wheel stand without affecting the automatic movement thereof.

A further object of the invention is to provide a grinding machine which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a somewhat schematic partial front and partial sectional view of the grinding machine constructed in accordance with the invention;

FIG. 2 is a section taken on the line II—II of FIG. 1;

FIFG. 3 is a view similar to FIG. 1 of another embodiment of the invention; and

FIG. 4 is a sectional view similar to FIG. 2 of another embodiment of the invention.

Referring to the drawings in particular, the invention embodied therein includes a machine frame 1 for the thread grinding machine which carries a table or slide 2 for the workpiece supporting spindles. The slide 2 may be moved backwardly and forwardly in longitudinal directions on guides 3 of the frame as indicated by the double arrows at 4. A workpiece 6 to be ground with a taper thread is held between points 7, 7 of a spindle sleeve 8 and a spindle sleeve 9, respectively, and it receives its rotary drive through cam followers (not shown) driving the workpiece spindle 9. The cam followers (not shown) are mounted in a spindle box 10 for rotation by an electrical driving motor 11. A gear system schematically indicated at 12 within the spindle box 10 acts through change gears 13 to rotate a feed spindle or screw 5. In this embodiment of FIG. 1, the feed spindle 5 is rotatably journalled between depending bearing elements 2a and 2b of the slide 2.

A grinding wheel 14 is rotatably mounted in the wheel stand 15 and is rotated by a separate electric motor (not shown). The wheel stand 15 is displaceable cross-wise or transverse to the workpiece 6 on cross guides 16 of the frame 1 for feed movement. For the execution of such feed movement there is mounted in the frame 1 a feed spindle 18 or screw which is supported in an elongated bearing 1a for axial as well as rotative movement (FIG. 2). Rotation of the screw 18 in the nut 19 formed as a depending projection of the wheel stand 15 causes feed movement of the wheel stand in the direction of the double arrows indicated at 17 in FIG. 2.

The inventive construction includes a manual feed provided by rotation of a hand wheel 20 affixed to a shaft 21 which carries a gear 22 which meshes with an axially elongated pinion 23 affixed to the shaft of the feed spindle 18.

The invention further provides a rapid automatic feed provided by a hydraulic piston drive which includes a cylinder 24, in which there is a displaceable piston 25 having a piston rod 26 which is formed as an extension of the shaft of the feed spindle 18. The rod 26 also carries the elongated gear 23.

For the longitudinal movement of the workpiece supporting table 2 there is provided a spindle nut 27 (FIG. 1) which is affixed to the frame 1 in this embodiment but which in the embodiment indicated in FIG. 3 is carried by the workpiece supporting table 2 and movable therewith. In the FIG. 1 embodiment, the nut 27 is in operative threaded engagement with the screw 5 and rotation of the screw 5 causes axial movement of the screw with the workpiece supporting table 2. The rotation of the screw 5 is effected through the motor 11 via the change gear 13.

In accordance with the invention for the continuous feed for taper grinding instead of the usual control ruler there is provided a drive system which is operated from the guide spindle 5 through change gears 28. The construction is such that the existing rapid feed as well as a manual feed may be operated at any time. Two embodiments of the construction are indicated in FIGS. 2 and 4. Each of the embodiments are applicable to the alternate embodiments indicated in FIGS. 1 and 3, thus providing a total of four different forms of embodiments as indicated.

According to FIGS. 1 and 2, the taper grinding is accomplished or constituted as follows:

The shaft of the guide spindle 5 is provided with a gear 29 which rotates a gear 30. The gear 30 is axially displaceable on its shaft 31 but angularly locked in respect thereto. The shaft 31 is a sliding shaft rotatably mounted in a machine frame 1 and is provided with a gear at its outer end which forms part of the change gear system 28. The shaft 32 which is rotatably mounted in the shaft 31 also carries a gear which is part of the change gear system 28. The opposite end of shaft 32 carries a bevel gear 33 which engages with a bevel gear 34 affixed to a shaft 35. The shaft 35 is a relatively short sliding shaft which is slidable in a feed spindle 36, but which is angularly locked in respect to the feed spindle 36 so that rotation of the shaft 35 causes corresponding rotation of the feed spindle. The feed spindle 36 is threadably engaged with a stationary nut 37 mounted on frame 1. Rotation of the feed spindle 36 therefore causes this axial movement. The first feed spindle 18 having the long pinion 23 carried by the piston rod 26 of the hydraulic piston drive for the rapid feed and the second feed spindle 36 are aligned coaxially. The axial displacement of the feed spindle 36 causes through a projection 39, the axial displacement of the cylinder 24. A compression spring 38 biases the cylinder 24 against the stop 39.

When the drive system for taper grinding is connected by the insertion of the change gears 28, the action of the device is as follows:

The shaft 32, driven by the change gears 28 transmits the rotary movement derived from the guide spindle 5 through gears 29, 30 and change gears 28 and bevel gears 33 and 34 to the spindle 36. The spindle 36 screws in the stationary nut 37 and moves axially to cause displacement of the cylinder 24 to cause a shifting of the wheel stand 15 to the left according to the diameter increase at the conical workpiece 6. This rapid feed can be operated in conjunction with a manual feed by the hand wheel 20, since the movement of the piston 25 will superimpose itself at any time on the feed movement controlled by the second feed spindle 36 or joins in such movement. The piston 25 can rotate in the cylinder 24 during manual feed.

At the end of the taper grinding, there occurs a free stroke of the grinding wheel caused by the rapid feed drive whereupon the slide 2 returns to its initial position usually in a rapid motion and the second feed spindle 36 executes a return movement to the right to the initial position due to the reversal of the direction of rotation. The compression springs 38 cause the cylinder 24 to shift to the right. After this has been done, the next work cycle for the taper grinding on the same or new workpiece can begin.

In the embodiment indicated in FIG. 4, there is no feed spindle corresponding to the feed spindle 36. The bevel bear 33 drives a bevel gear 34' which is affixed to a shaft 35a. The shaft 35a carries a magnetic coupling 40 which when actuated drives or connects with a gear 41 which meshes with the axially elongated pinion 23 carried on the extension of the piston rod 26. The electro-magnetic coupling is connected to a voltage and current supply as indicated at 44 and with an electrical limit switch 42. The limit switch 42 is operated by moving the hand wheel to the left, that is, by pressing it in. Any similar switch means or push keys comparable to the switch 42 may, of course, be employed. Upon inward movement of the hand wheel, the limit switch is actuated to disengage the magnetic clutch 40. When disconnected, the drive system for the taper grinding will be carried out through the manual feed produced by the hand weel 20. The arrangement is such that rapid feed adjustment through movement of the cylinder 24 or by movement of the piston 25 may be accomplished. By supplying fluid pressure to selected conduits 50 or 52 on opposite sides of the piston 25, the piston may be shifted to shift wheel stand 15. Of course, the piston may be operated without the connection of the magnetic clutch 40.

All examples of construction represented and described have in common the advantage that they do not require a control ruler for the taper grinding. The transmission ratios corresponding to the various pitches are easily set by changing the change gear 28.

While specific embodiments of the invention have been shown and described in detail to illustrate the application of the inventive principles, it will be understood that the invention may be embodied otherwise without departing from such principles.

What is claimed is:

1. A grinding machine particularly for grinding taper threads comprising a frame, a workpiece spindle carriage movable in longitudinal directions on said frame, a rotatable workpiece supporting spindle mounted on said spindle carriage, a grinding wheel stand for rotatably mounting a grinding wheel mounted on said frame for feed movement in directions transvese to said spindle, and an interconnected gear drive connected to rotate said workpiece supporting spindle, to move said workpiece spindle carriage longitudinally, and to move said grinding wheel stand transversely to said spindle in feed movements, and including change gears for varying the rate of such feed movements relative to workpiece rotation and workpiece movement in accordance with the workpiece to be operated upon.

2. A grinding machine, according to claim 1, wherein said interconnected gear drive includes a rotatable threaded spindle for shifting said workpiece spindle carriage, and nut means threadably engageable with said spindle and producing upon rotation of said spindle relative axial displacement between said spindle and said nut means.

3. A grinding machine, according to claim 2, wherein said rotatable spindle is carried by said workpiece spindle carriage and said nut means is affixed to said frame.

4. A grinding machine, according to claim 2, wherein said spindle is rotatably mounted on said frame and said nut means is carried by said carriage.

5. A grinding machine, according to claim 1, wherein said interconnected gear drive includes a grinding wheel shifting spindle and a grinding wheel nut member threadably engaged with said spindle, said nut member and said spindle being relatively axially displaceable upon rotation of said spindle.

6. A grinding machine, according to claim 5, including a rotatable hand wheel, and gear means connected between said rotatable hand wheel and said rotatable grinding wheel spindle for rotating said grinding wheel spindle to cause relative axial displacement of said grinding wheel spindle in respect to said nut member.

7. A grinding machine, according to claim 1, wherein said interconnected gear drive includes a fluid cylinder, a piston displaceable in said cylinder said piston being connected to said grinding wheel stand for rapidly shifting said wheel stand upon displacement of said piston.

8. A grinding machine, according to claim 7, including a nut member secured to said grinding wheel stand, a grinding wheel feed spindle threadably engaged with said nut member and being rotatable to cause displacement of said member with said grind wheel stand, and hand wheel means connected to said grinding wheel spindle and rotatable to shift said spindle independently of said piston.

9. A grinding machine particularly for grinding taper threads comprising a frame, a workpiece spindle carriage movable in longitudinal directions on said frame, rotatable workpiece spindle supporting means mounted on said spindle carriage, a grinding wheel stand mounted for movement in directions transverse to the movement of said spindle, a driving motor, means connected to said driving motor for rotating said rotatable workpiece spindle supporting means, a rotatable workpiece spindle carriage feeding screw connected to said motor for rotation thereby, a nut member threadably engaged with said workpiece spindle carriage feeding screw, said nut and said workpiece spindle carriage feeding screw being supported between said frame and said workpiece spindle whereby rotation of said feed screw is effective to move said carriage, change gear means connected to said workpiece spindle carriage feed screws and rotatable upon rotation thereof, means connected to said change gear means and to said grinding wheel stand for shifting said grinding wheel stand transversely in feed movements in timed relationship to the movements of the workpiece spindle carriage, a grinding wheel stand feeding screw rotatably supported on said frame, said grinding wheel stand having a nut threadably engaged with said feeding screw and movable upon rotation of said wheel stand feeding screw for moving said wheel stand, gear means connected to said workpiece spindle carriage feeding screw, and magnetic coupling means for disengaging said gear means.

10. A grinding machine particularly for grinding taper threads comprising a frame, a workpiece spindle carriage movable backwardly and forwardly on said frame, a rotatable workpiece spindle supporting means mounted on said spindle carriage, a grinding wheel stand disposed along said carriage and mounted for movement toward and away from said spindle carriage at a location to contact a workpiece held by the spindle carriage in feeding movements, a rotatable workpiece spindle carriage feeding screw connected to said carriage and being rotatable to shift said carriage backwardly and forwardly, a rotatable grinding wheel stand feed screw connected to said grinding wheel stand for shifting said grinding wheel stand toward and away from said spindle carriage, and an interconnected gear drive connected between said rotatable workpiece spindle supporting means, said spindle carriage feeding screw and said grinding wheel feeding screw including a first set of speed change gears connected between said rotatable workpiece spindle supporting means and said spindle carriage feeding screw and a second set set of speed change gears connected between said spindle carriage feeding screw and said grinding stand feeding screw.

11. A grinding machine according to claim 10, including disconnectable coupling means disposed between said spindle carriage feeding screw and said grinding wheel stand feed screw including a piston connectable to said grinding wheel feed screw for rotating said screw rapidly upon displacement of said piston.

12. A grinding machine according to claim 11, wherein said coupling means includes an axially elongated gear and a hand wheel having a gear connected thereto engageable with said elongated gear but being movable out of engagement therewith when manual operation is not desired.

13. A grinding machine, according to claim 9, including a piston connected to said wheel stand feeding screw for moving said feeding screw with said wheel stand when said gear means is disengaged.

14. A device according to claim 13, further including hand wheel means connected to said wheel stand feeding screw for rotating said feeding screw independently of the movement of said piston or the movement of said gear means.

References Cited
UNITED STATES PATENTS

| | | | |
|---|---|---|---|
| 504,565 | 9/1893 | Currie | 82—16 |
| 2,349,477 | 5/1944 | Turrettini | 51—95.2 |
| 3,104,505 | 9/1963 | Schohl | 51—259 |

ROBERT C. RIORDON, *Primary Examiner.*

L. S. SELMAN, D. G. KELLY, *Assistant Examiners.*